No. 833,056. PATENTED OCT. 9, 1906.
F. G. KAMMERER.
FILTER.
APPLICATION FILED JAN. 15, 1906.
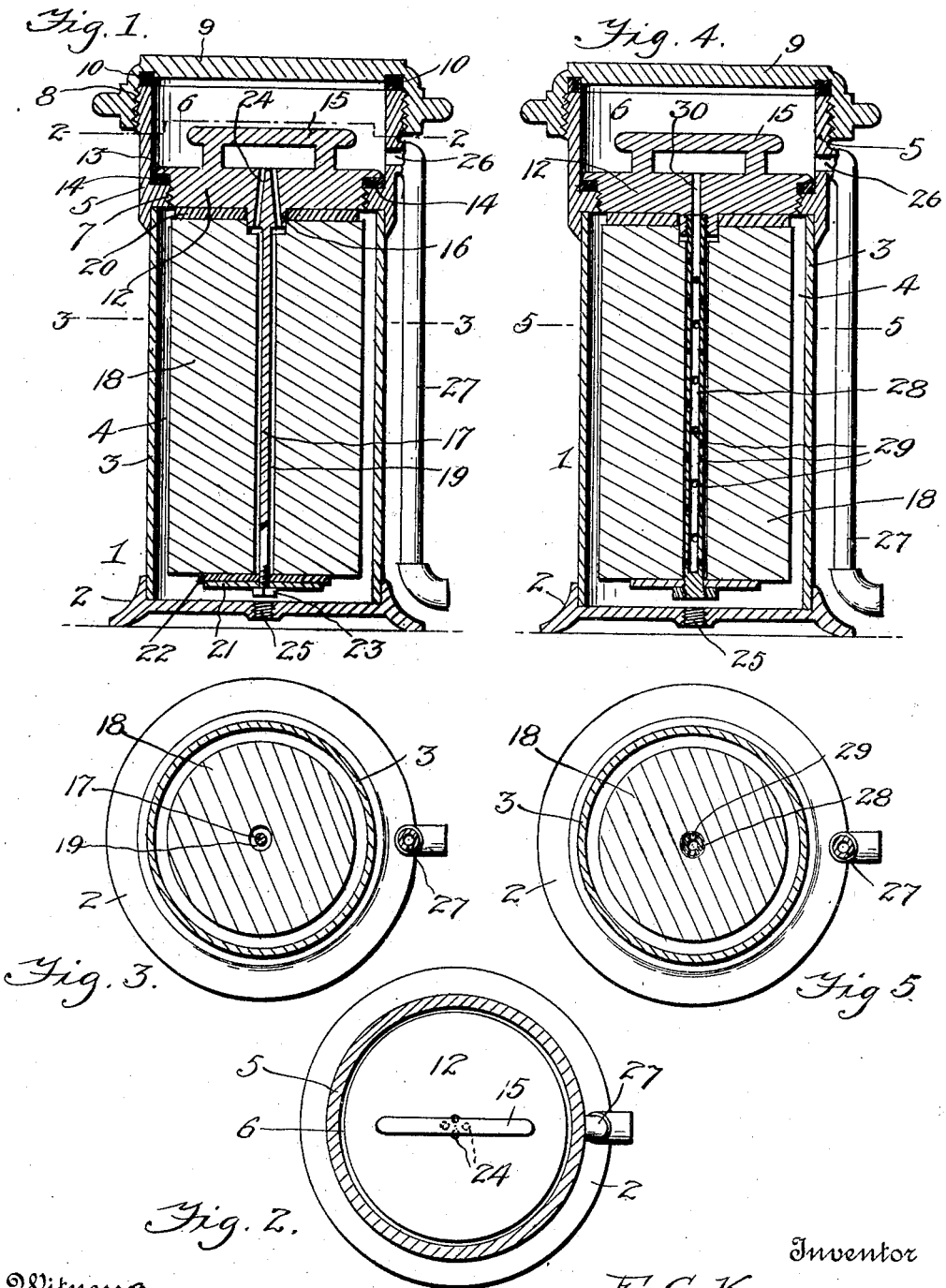
Witnesses
J. A. Griesbauer Jr.
C. N. Griesbauer.
Inventor
F. G. Kammerer
by H. B. Wilson
Attorney

UNITED STATES PATENT OFFICE.

FRANK G. KAMMERER, OF CHICAGO, ILLINOIS.

FILTER.

No. 833,056.  Specification of Letters Patent.  Patented Oct. 9, 1906.

Application filed January 15, 1906. Serial No. 296,198.

*To all whom it may concern:*

Be it known that I, FRANK G. KAMMERER, a citizen of the United States, residing at Chicago, in the county of Cook and State of Illinois, have invented certain new and useful Improvements in Filters; and I do declare the following to be a full, clear, and exact description of the invention, such as will enable others skilled in the art to which it appertains to make and use the same.

This invention relates to improvements in filters.

The object of the invention is to provide a filter which will be simple in operation and constructed in such a manner that the parts of the same may easily be separated for cleaning and in which the filtering medium may be readily removed and replaced by another.

With the above and other objects in view the invention consists of certain novel features of construction, combination, and arrangement of parts as will be hereinafter described and claimed.

In the accompanying drawings, Figure 1 is a vertical sectional view of a filter constructed in accordance with the invention. Fig. 2 is a cross-sectional view on the line 2 2 of Fig. 1. Fig. 3 is a similar view on the line 3 3 of Fig. 1. Fig. 4 is a vertical sectional view of a modified form of filter, and Fig. 5 is a cross-sectional view on the line 5 5 of Fig. 4.

Referring more particularly to the drawings, 1 denotes a shell or casing, which is preferably formed of a base-section 2, a lower cylindrical body portion 3 forming an inlet or filtering chamber 4, and an upper section 5, forming a discharge-chamber 6. Near the lower end of the upper section 5 is formed an inner annular threaded flange 7, which is adapted to engage and rest upon the upper end of the body portion 2. The upper end of the section 5 is provided with exterior screw-threads 8, on which is adapted to be screwed a cap 9, between which and the upper end of the section 5 is arranged a gasket 10. Adapted to be screwed into engagement with the threaded flange 7 is a screw-plug 12, on which is formed an annular flange 13, between which and the flange 7 is arranged a gasket 14. The plug 12 separates the inlet or filtering chamber 4 from the discharge-chamber 6 and is provided with a handle 15 to facilitate the screwing and unscrewing of the same. On the under side of the plug 12 is arranged a boss 16, on which is formed a clamping rod or bar 17, said rod and boss being preferably formed integrally with the plug, as shown.

The clamping-rod 17 is adapted to be inserted through a filtering medium 18, which is here shown and is preferably in the form of a natural or artificial stone. Said stone is provided with a centrally-disposed bore 19 of somewhat larger diameter than the clamping-rod 17, thus forming a space between the rod and the walls of the bore, as shown. Between the upper end of the stone and the adjacent lower side of the plug 12 is arranged a washer 20. On the lower end of the rod, which projects a slight distance through the opposite end of the filter-stone, is arranged a clamping-plate 21, between which and the adjacent lower end of the stone is arranged a washer 22. The end of the rod which projects through the clamping-plate 21 is threaded, and onto said threaded end is adapted to be screwed a clamping-nut 23, thereby holding the stone 18 into tight engagement with the plug 12. In the plug 12 and the boss 16 around the clamping-rod 17 is arranged a series of apertures or passages 24, through which water may pass from the space between the rod 17 and the walls of the bore in the filter-stone through the discharge-chamber 6 to the filter. At a suitable point in the base or body portion of the inlet or filtering chamber is arranged an inlet-port 25, said port being here shown and is preferably arranged in the center of the bottom of the base portion 2, as shown, and to said port is adapted to be connected a water-supply pipe. (Not shown.) In the section 5 forming the discharge-chamber is arranged a discharge-port 26, said port being preferably arranged in one side and near the bottom of said chamber, as shown. To the port 26 is connected a discharge-pipe 27, which may extend in any direction, but which is here shown and preferably extends downwardly toward the bottom of the filter, where it may be connected with a suitable receptacle or provided with a faucet.

In Figs. 4 and 5 of the drawings is shown a slightly-modified construction of the filter. In this instance the clamping rod or bar is formed of a tube 28, in the sides of which is formed a series of inlet-apertures 29, whereby the water passing from through the filtering-stone from the inlet-chamber into the central bore of said stone may enter the tube 28 and be conducted therethrough and through an alined aperture 30 formed in the plug and discharged into the chamber 6 in a filtered condition and from said chamber may be conducted through discharge-pipes for use. In this latter form of the invention the apertures or passages 24 in the plug 12 are dispensed with.

In the form of device shown in the first figures of the drawings the water passes through the filtering-stone from the inlet-chamber 4 to the central bore or passage in the stone and from thence passes upwardly through the apertures or passages 24 in the plug and into the discharge-chamber 6 in a filtered condition and from said chamber may be conducted through the pipe 27 as hereinbefore described.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Lettert Patent, is—

1. In a filter, the combination with a shell or casing having an inlet and a discharge port, of an apertured screw-plug adapted to be screwed into engagement with a threaded flange arranged in said casing, thereby separating the latter into inlet and discharge chambers, a screw-cap to close said discharge-chamber, a filtering-cylinder in said casing and having formed therethrough a centrally-disposed bore, a clamping rod or bar arranged on said plug and adapted to project through the bore in said filtering-cylinder, and means to clamp said cylinder into water-tight engagement with said plug, substantially as described.

2. In a filter, the combination with a shell or casing having an inlet and a discharge port, of an apertured screw-plug adapted to be screwed into engagement with a threaded flange arranged in said casing, thereby separating the latter into inlet and discharge chambers, a screw-cap to close said discharge-chamber, a filtering-cylinder having formed therethrough a centrally-disposed bore, a clamping rod or bar arranged on said plug and adapted to project through the bore in said filtering-cylinder, a washer arranged between said cylinder and said plug, a clamping plate and nut arranged on the threaded lower end of said rod, a washer arranged between said clamping-plate and the adjacent end of said cylinder, and a handle arranged on said screw-plug, substantially as described.

In testimony whereof I have hereunto set my hand in presence of two subscribing witnesses.

FRANK G. KAMMERER.

Witnesses:
JOSEPH J. PURCELL,
ROBERT C. LUDWIG.